United States Patent
Kim et al.

(10) Patent No.: US 12,534,628 B2
(45) Date of Patent: Jan. 27, 2026

(54) HEAT-RESISTANT COATING COMPOSITION

(71) Applicant: KOLON INDUSTRIES, INC., Seoul (KR)

(72) Inventors: Choongnyun Paul Kim, Seoul (KR); Geun Sang Cho, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 760 days.

(21) Appl. No.: 17/758,714

(22) PCT Filed: Jan. 11, 2021

(86) PCT No.: PCT/KR2021/000353
§ 371 (c)(1),
(2) Date: Jul. 13, 2022

(87) PCT Pub. No.: WO2021/145628
PCT Pub. Date: Jul. 22, 2021

(65) Prior Publication Data
US 2023/0043932 A1    Feb. 9, 2023

(30) Foreign Application Priority Data

Jan. 16, 2020  (KR) .................. 10-2020-0006229
Jan. 4, 2021   (KR) .................. 10-2021-0000549

(51) Int. Cl.
C09D 5/18      (2006.01)
C09D 7/40      (2018.01)
C09D 7/61      (2018.01)
C09D 123/28    (2006.01)

(52) U.S. Cl.
CPC .............. *C09D 5/18* (2013.01); *C09D 7/61* (2018.01); *C09D 7/68* (2018.01); *C09D 7/69* (2018.01); *C09D 123/283* (2013.01)

(58) Field of Classification Search
CPC ... C09D 5/18; C09D 5/00; C09D 7/61; C09D 7/68; C09D 7/69; C09D 123/283; C09D 5/38; C09D 127/12; C09D 127/18; C08K 3/08; C08K 2003/0856; B22F 1/05; B22F 1/08; B22F 1/10; B22F 7/04
See application file for complete search history.

(56) References Cited

U.S. PATENT DOCUMENTS 10,207,226 B2    2/2019    Kobayashi

FOREIGN PATENT DOCUMENTS

| CN | 106929845 A | 7/2017 | |
|---|---|---|---|
| CN | 109504965 A | 3/2019 | |
| JP | H01278580 A * | 11/1989 | |
| KR | 1020040070446 A | 8/2004 | |
| KR | 10-0677956 B1 | 2/2007 | |
| KR | 10-0684661 B1 | 2/2007 | |
| KR | 10-0789694 B1 | 1/2008 | |
| KR | 100926516 B1 | 11/2009 | |
| KR | 20100066931 A | 6/2010 | |
| KR | 20110016289 A * | 2/2011 | .......... B82B 3/0095 |
| KR | 1020120139821 A | 12/2012 | |
| KR | 101431148 B1 | 8/2014 | |
| WO | 2015-046430 A1 | 4/2015 | |
| WO | WO-2019097449 A1 * | 5/2019 | ............ C08J 9/0004 |

OTHER PUBLICATIONS

Machine Translation of JP-H01278580-A (Year: 1989).*
Blakely, Peter, "FEP Datasheet and FEP Properties", FEP Film, <https://fep-film.com/fep-datasheet-fep-properties/>.*
Murugaiyan, et al., "Glass forming ability and soft-magnetic properties of Fe-based glassy alloys developed using high phosphorous pig Iron", Journal of Alloys and Compounds, vol. 821, 153255, <https://www.sciencedirect.com/science/article/pii/S0925838819345013>.*
Yao, et al., "Thermal transport property correlated with microstructural evolution of Fe-based amorphous alloy", Acta Materialia, vol. 200, p. 793-802, <https://www.sciencedirect.com/science/article/pii/S1359645420307667#:~:text=For%20example%2C%20Fe48Cr,/mK)%20%5B20%5D>.*
ASM International, ASM Ready Reference: Thermal Properties of Materials, Chapter 2 Thermal Expansion, <http://www.owlnet.rice.edu/~msci301/ThermalExpansion.pdf>.*
Machine Translation of KR-20110016289-A (Year: 2011).*
Georg Fischer, "Polyvinylidenefluoride (PVDF)", <https://www.peterss.lv/en/products/materials/pvdf-c13>.*
Office Action from Japanese Patent Office, dated Jan. 14, 2025.

* cited by examiner

*Primary Examiner* — Amber R Orlando
*Assistant Examiner* — Sarah Catherine Case
(74) *Attorney, Agent, or Firm* — Harvest IP Law, LLP

(57) ABSTRACT

According to an aspect of the present disclosure, a heat-resistant coating composition includes: an inorganic filler which is iron (Fe)-based amorphous alloy powder having an amorphous phase and an average particle diameter of 0.5 μm to 15 μm; and a binder, where the coefficient of thermal expansion of the inorganic filler is lower than the coefficient of thermal expansion of the binder.

11 Claims, No Drawings

HEAT-RESISTANT COATING COMPOSITION

CROSS REFERENCE TO RELATED APPLICATIONS

This application is a National Stage of International Application No. PCT/KR2021/000353 filed Jan. 11, 2021, claiming priority based on Korean Patent Application No. 10-2020-0006229 filed on Jan. 16, 2020 and Korean Patent Application No. 10-2021-0000549 filed on Jan. 4, 2021.

TECHNICAL FIELD

An aspect of the present disclosure relates to a heat-resistant coating composition, and more particularly, to a heat-resistant coating composition including binder and filler and capable of forming a heat-resistant coating layer when applied to a base material, and a heat-resistant coated member having a heat-resistant coating layer.

BACKGROUND ART

A painting material is a material having fluidity and forming a thin, hard coating layer called a film or a painting film when applied to a surface of an object such as a solid object, and examples thereof includes a solvent paint containing a solvent and a powder paint containing no solvent. In general, painting materials are also known as paint or varnish and are used for decorative purposes to beautify or decorate the surfaces of objects by imparting colors, luster, or the like to the surfaces of objects. Painting materials may also be used to extend the lifespan of objects by protecting objects from external physical or chemical factors to prevent corrosion, fracture, or deterioration. Thus, painting materials are used in various technical fields and real life.

Painting materials are used in various fields of real life, for example, for painting the outsides of buildings or sculptures, coating the surfaces of cooking utensils such as cooking containers. In general, heat-resistant coating layers, which are capable of preventing food from sticking thereto, have high thermal conductivity, and do not generate harmful substances, are widely used for cooking utensils such as pots and frying pans.

There are various conventional techniques in the field of surface coatings of cookware, and coating films formed of polytetrafluoroethylene (PTFE), known as Teflon®, have been sold worldwide as a coating material for cookware.

Water or oil does not easily adhere to the surface of a Teflon® coating formed using a PTFE material, and owing to this high non-stickiness, Teflon® coatings make it easy to cook food and are easily cleaned. In addition, Teflon® coatings have good heat resistance and a very high pyrolysis temperature. Thus, Teflon® coatings are very advantageous as cookware coatings. However, it is difficult to form Teflon® coatings on metals because Teflon® coatings have a coefficient of thermal expansion very different from those of metals, poor adhesion to metals, and poor wettability with a contact angle of about 104 degrees.

In addition, Teflon® coatings are formed by applying a coating material to a body, and then hardening and thermally curing the coating material. Thus, Teflon® coatings have low ductility, and when impacted, Teflon® coatings may be separated because of degradation caused by repeated heating. In particular, when the surface is scratched with a tool such as a spoon or a spatula, the Teflon® coating may be easily separated due to deterioration of adhesion and thus may not function properly.

Thus, research has been constantly conducted to overcome such shortcomings of Teflon coatings. For example, Korean Patent No. 684661 discloses a triple-coated kitchen container coated with silver powder. Although the triple-coated kitchen container uses silver having a unique function such as sterilization and antibacterial effects, a Teflon® coating layer used as a lower coating layer is directly in contact with a metal surface, and thus problems related to heat resistance may occur. In addition, since a Teflon® coating layer is provided as a lower coating layer, and Teflon® coating layers containing silver powder are provided as middle and upper coating layers, it is necessary to cure the Teflon® coating layer in each layer, requiring a considerable period of time for curing the Teflon® coating layers and thus decreasing productivity. In addition, due to a large shear force between a base material surface and the Teflon® coating layers, the Teflon® coating layers may be easily separated.

Besides, for example, a patent (Korean Patent No. 10-0789694) uses a lacquer sap, which is a plant sap, for coating, and a patent (Korean Patent Application Laid-open Publication No. 10-2010-0066931) uses nickel and copper-based materials.

Recently, in order to overcome demerits of Teflon® coatings, various cooking utensils have been produced and sold under the names of marble coating, diamond coating, titanium coating, etc. which include various materials or coating layers. However, such products substantially use PTFE-based resins by additionally forming an upper coating layer or adding expensive particles, resulting in poor productivity or failing to provide distinguishable effects.

As described above, conventional techniques in the fields of cooking utensil coatings have problems such as lack of durability caused by poor abrasion resistance, insufficient heat resistance, harmfulness to the human body, poor productivity caused by unnecessary processes, and difficulty in coating work. In addition, there is a need to prevent coating layers from being separated from each other and supplement food releasability from a cooking surface. Thus, to address these problems, research has been constantly conducted into coating materials for cooking utensils, and coating compositions for coating cooking utensils.

DISCLOSURE

Technical Problem

An aspect of the present disclosure is to provide a heat-resistant coating composition used to form, on a surface of a cooking utensil, a coating layer which has high heat resistance and abrasion resistance and is thus not easily scratched and peeled.

In addition, an aspect of the present disclosure is to provide a coating composition having improved wettability and high adhesion to a base material.

In addition, an object of the present disclosure to provide a heat-resistant coating composition having good physical properties such as hardness, corrosion resistance, and abrasion resistance at surface, and good non-stickiness with respect to food.

Technical Solution

According to an aspect of the present disclosure, a heat-resistant coating composition includes: an inorganic filler which is iron (Fe)-based amorphous alloy powder having an amorphous phase and an average particle diameter of 0.5 μm to 15 μm; and a binder, wherein the inorganic filler has a thermal expansion coefficient lower than a thermal expansion coefficient of the binder.

In this case, the inorganic filler may have thermal conductivity greater than thermal conductivity of the binder, and the heat-resistant coating composition may include 1 wt % to 5 wt % of the inorganic filler.

In addition, the inorganic filler may have a glass transition temperature (Tg) higher than a melting point (Tm) of the binder.

The binder may include a fluorine-based resin including at least one of PTFE, ETFE, FEP, and PFA.

In this case, the inorganic filler may be alloy powder including: iron (Fe); and at least one selected from the group consisting of molybdenum (Mo), chromium (Cr), boron (B), carbon (C), nickel (Ni), cobalt (Co), silicon (Si), phosphorus (P), and niobium (Nb).

According to another aspect of the present disclosure, a heat-resistant coating member includes: a heat-resistant coating layer formed of the heat-resistant coating composition; and a base material on which the heat-resistant coating layer is provided.

In this case, the heat-resistant coating layer may have a thickness of 20 μm to 30 μm.

The average particle diameter of the inorganic filler may be 0.0125 times to 0.5 times of a thickness of the heat-resistant coating layer.

At least one of the inorganic filler may protrude outwardly from a surface of the heat-resistant coating layer, and
a protruding height of the inorganic filler protruding outwardly from the surface of the heat-resistant coating layer may be 0.01 times to 0.1 times of a thickness of the heat-resistant coating layer.

In addition, the protruding height may be 0.1 times to 0.5 times of the average particle diameter of the inorganic filler.

When an arbitrary square area having a width of 1 cm and a length of 1 cm is defined on the surface of the heat-resistant coating layer, the inorganic filler may have an area fraction of 0.3% to 1.4% in the surface.

Advantageous Effects

According to an embodiment of the present disclosure, the heat-resistant coating composition includes iron-based amorphous alloy powder as a filler, and the iron-based amorphous alloy powder filler has a coefficient of thermal expansion lower than that of a binder and a thermal conductivity between the thermal conductivity of a base material and the thermal conductivity of the binder. Therefore, the physical properties of the base material and the binder may be less different from each other at high temperature, thereby preventing a coating layer from having poor adhesion or being peeled off due to repeated heating and cooling and guaranteeing uniform heat conduction through a cooking surface of a cooking utensil to cook food uniformly.

In addition, according to an embodiment of the present disclosure, the heat-resistant coating composition includes iron-based alloy powder filler and may thus have improved adhesion and wettability with respect to a base material or primer layer. Therefore, the heat-resistant coating composition may be easily coated on the base material to form a coating layer, and the coating layer may not be easily separated or peeled off owing to good adhesion.

In addition, according to an embodiment of the present disclosure, the coating composition may be used as a powder paint not containing a solvent. Thus, the coating composition may decrease environmental pollution due to the reduced formation of VOCs, and the dispersion of an amorphous alloy filler of the coating composition may be improved. In addition, even a single layer of the coating composition may provide good corrosion resistance and heat resistance, thereby preventing problems such as separation or slipping caused by poor adhesion between coating layers and thus increasing the lifespan of a cooking utensil.

In addition, according to an embodiment of the present disclosure, the coating composition includes an iron-based amorphous alloy powder filler having a particle diameter occupying a specific portion of the thickness of a coating layer. Therefore, the filler in the cured coating layer may support and fix the coating layer, and the coating layer may have high resistance to slipping caused by external shear force.

In addition, since the amorphous alloy powder filler has a protruding height from the surface of the coating layer, the coating layer may have improved non-stickiness with respect to food during cooking, and food may be easily cooked owing to the thermal conductivity of the amorphous alloy powder filler. In addition, since a cooking tool does not make direct contact with the coating layer because the protruding amorphous alloy powder filler blocks the cooking tool, the coating layer may be less scratched or peeled.

In addition, a coating layer formed of the coating composition according to an aspect of the present disclosure may have good thermal conductivity, high-temperature corrosion resistance, and heat resistance, and thus the coating layer may not be easily oxidized or corroded even in repeating heating and cooling conditions, thereby having a long lifespan or increasing the lifespan of a cooking utensil.

BEST MODE

In the following detailed description of the present disclosure, it should be understood that terms are used for the purpose of describing specific embodiments and is not intended to limit the scope of the present disclosure defined by only the appended claims. All technical and scientific terms used herein have the same meanings as commonly understood by those of ordinary skill in the art, unless otherwise stated.

Throughout the description and claims, unless stated otherwise, the term "comprise," "comprises," or "comprising" specifies the presence of a stated object or operation, or a group of stated objects or operations, but do not preclude the presence or addition of another object or operation or a group of other objects or operations.

In addition, various embodiments of the present disclosure may be combined with any other embodiments unless clearly stated to the contrary. Any feature described as being particularly preferred or advantageous may be combined with any other feature or features described as being preferred or advantageous. Hereinafter, embodiments of the present disclosure and effects thereof will be described with reference to the accompanying drawings.

In the present specification, the term "painting material" is used as a generic term for materials that are applied to the surfaces of solids to form thin and hard films or coating layers, and a painting material may also be called paint or varnish and may refer to a coating composition for forming a coating layer.

In addition, a paint or coating composition may be applied to the surface of an object and may then be dried to form a coating film or coating layer, and in this case, the term "coating" may be used to indicate the coating layer formed of the coating composition.

According to an aspect of the present disclosure, a heat-resistant coating composition includes a binder; and alloy powder as an inorganic filler dispersed in the binder.

The filler included in the coating composition is a general term for powdery particles that do not dissolve in water or organic solvents and includes pigments. In addition, the filler refers to a powdery additive which is included in a powdery painting material together with a powdery resin.

According to an embodiment of the present disclosure, the coating composition includes alloy powder as the filler.

In this case, the composition of the alloy powder is not limited, but an alloy, which does not generate substances harmful to the human body, does not easily undergo corrosion, and has high heat resistance at high temperature, may be used. The alloy powder may preferably be an amorphous alloy powder particle and may more specifically an iron (Fe)-based amorphous alloy powder.

When an Fe-based amorphous alloy powder is used as the amorphous alloy powder, the amorphous alloy powder may have an alloy composition including at least one element selected from the group consisting of Cr, Co, Mo, Ni, Cu, Nb, Si, B, C and P, and the balance of Fe.

The Fe-based amorphous alloy having the above-described composition has high adhesion to a fluorine-based resin and facilitates the fibrillation of the fluorine-based resin, such that the inorganic filler including the Fe-based amorphous alloy may not be easily separated from the binder, thereby increasing wear resistance and lifespan.

The filler may further include additional materials in addition to the alloy powder. For example, the filler may further include an inorganic filler such as alumina or barium sulfate, which is used as a colorant or extender in coating material paints; an inorganic filler used for coloration, gloss, color development, fastness, or the like; or an organic filler including vegetable and animal organic materials. In another example, the filler may further include kaolin, bentonite, perlite, talc, zeolite, mica, calcium carbonate, silicate mineral, alumina, aluminosilicate oxide, clay mineral, metal particles, metal oxide particles (titanium dioxide, iron oxide, or the like), or the like. An inorganic filler containing an alloy or a metal is preferable.

The alloy powder used as the inorganic filler may be of a spherical type, a flake type, a plate type, a needle type, a hollow type, or the like, and may preferably be of a spherical type or a flake type.

The particle diameter of the alloy powder is measured and calculated differently depending on the shape of the alloy powder particle. For example, the particle diameter of the alloy powder particle may be the diameter of spherical particles when the alloy powder particle is a spherical powder particle; the average of major and minor diameters when the alloy powder particle has a three-dimensional shape close to a sphere; and the average of major and minor lengths of a wide surface when the alloy powder particle has a flake or plate shape.

The average particle diameter of the alloy powder may be within the range of 0.5 μm to 15 μm, and preferably within the range of 1 μm to 5 μm. In addition, it is preferable that the alloy powder has uniform particle size distribution, and in this case, the alloy powder has D50 preferably within the range of 1 μm to 10 μm.

If the average particle diameter of the alloy powder is outside the range described above, it may be difficult to control the thickness of a coating layer during a process of forming the coating layer using the coating composition, the inorganic filler may not be uniformly dispersed, or the area of the inorganic filler exposed on the surface of the coating layer may decrease to cause poor or non-uniform surface characteristics.

The properties of the coating composition and the properties of the coating layer formed of the coating composition may vary depending on the content of the inorganic filler in the coating composition. The inorganic filler has high adhesion and support force with respect to a base material or a primer layer provided on the base material when the coating composition is applied. Therefore, the inorganic filler improves wettability when the coating composition is applied and improves the adhesion of the coating layer formed through drying, hardening, or curing. Thus, the inorganic filler may effectively prevent separation or peeling of the coating layer. However, the amount of the inorganic filler is limited for proper formation of the coating layer.

The alloy powder used as the inorganic filler preferably has high hardness, corrosion resistance, oxidation resistance, thermal conductivity, etc. When the coating layer is formed, the alloy powder dispersed and included in the coating composition is located inside the coating layer and on the surface of the coating layer for fixing the binder and improving the adhesion between the coating layer and a lower layer provided under the coating layer, thereby preventing the coating layer from being separated or peeled off by shear force.

In the coating composition according to an embodiment of the present disclosure, the alloy powder used as the inorganic filler may be included in an amount of 1 wt % to 5 wt %, and preferably in an amount of 2 wt % to 4 wt %, based on the total weight of the coating composition.

If the content of the alloy powder relative to the total weight of the coating composition is outside the range described above, for example, if the content of the alloy powder is too low, there may be problems such as poor wettability of the coating composition, poor adhesion between the coating layer and a base material or a primer layer, poor thermal conductivity, or poor corrosion resistance. Conversely, if the content of the alloy powder is too high, the viscosity of the coating composition increases, and thus it may be difficult to uniformly form the coating layer or uniformly disperse the alloy powder. As a result, the quality of the coating layer may not be uniform.

The binder included in the coating composition is a component for bonding pigment particles or other particles to a painting surface to form a coating film or a coating layer. Thus, the binder is a essential component of the coating composition.

Resins that may be used as the binder is not limited, and any binder generally used in a coating composition may be included in the coating composition according to an aspect of the present disclosure.

According to an embodiment of the present disclosure, the binder is included in an amount of 95 wt % to 99 wt %, and preferably in an amount of 96 wt % to 98 wt %, based on the total weight of the coating composition.

If the content of the binder relative to the total weight of the paint composition is outside the range described above, for example, if the content of the binder is too high, the effects of preventing the coating layer from being separated, improving thermal conductivity and corrosion resistance and so on may be lowered. Conversely, if the content of the binder is too low, the viscosity of the coating composition increases, and thus it may be difficult to uniformly form the coating layer or uniformly disperse the alloy powder. As a result, the quality of the coating layer may not be uniform.

As the binder, various types of resins may be used. For example, a powdery resin or a liquid resin may be used as the binder. Preferably, a liquid resin may be used as the binder.

For example, a polyurethane resin, a vinyl resin, a silicone resin, an epoxy resin, a phenol resin, a polyester resin, an acrylic resin, or the like may be used as the binder. In addition, an acrylic modified resin or an organic modified resin may also be used as the binder. In addition, an acrylic emulsion resin, an ethylene vinyl acetate emulsion resin, or an acrylic silicone emulsion resin may also be used as the binder. In addition, a fluorine-based resin or a ceramic material may preferably be used as the binder to prevent food from sticking to a cooking utensil during cooking.

Specifically, the coating composition according to an embodiment of the present disclosure may be a resin solution containing a fluorine-based compound as a binder, and the binder may include at least one of PTFE, FEP, and PFA. For example, the binder may include a non-melting processable polytetrafluoroethylene (PTFE)-based resin or a polymer of PTFE and a fluorine-based compound. Specifically, the binder may include at least one selected from the group consisting of PTFE, ETFE, PCTFE, PCDF, PVF, CM-X™ (Allied), FEP® (Du Pont), PFA®, CYTOP® (Asahi Glass), Teflon® AF (Du Pont), TEFZEL® (Du Pont), and E-CTFE (HALAR®).

Preferably, the fluorine-based compound may have fibrillation tendency, and when a binder including the fluorine-based compound having fibrillation tendency is used, the inorganic filler may be strongly bonded to the binder such that the inorganic filler may be securely fixed and prevented from being separated.

When the binder having the above-described characteristics is used to form a coating film, the coating film may have high adhesion to a base material or a base body, good non-stickiness, and good hardness and abrasion resistance at high temperature.

The binder preferably has a melt viscosity within the range of $10^3$ poise to $10^6$ poise at 380° C., and preferably within the range of $10^4$ poise to $10^5$ poise at 380° C. If the melt viscosity of the binder is lower than the range described above, pinholes may be formed in a coating layer, and if the melt viscosity of the binder is greater than the range described above, a coating layer may have poor non-stickiness or poor surface hardness, or may be easily separated.

In addition, it is preferable that the binder have a low coefficient of friction. According to an embodiment of the present disclosure, for example, the coefficient of friction of the binder included in the coating composition may be within the range of 0.05 to 0.5 and preferably within the range of 0.1 to 0.4 under the condition of 7 kgf/cm$^2$ and 3 m/min.

When the coefficient of friction of the binder is outside the range described above, a coating layer may be easily separated or peeled due to friction on the cooking surface of a cooking utensil, and food may adhere or stick to the cooking utensil.

The heat-resistant coating composition of the present disclosure may further include additional components in addition to the inorganic filler and the binder. For example, the heat-resistant coating composition may further include an additive such as a thickener, a dispersant, a defoamer, a plasticizer, a flame retardant, an antifreeze agent, an emulsifier, a wetting agent, a pH adjuster, a leveling agent, a curing agent, an anti-pinhole agent, or a curing accelerator.

According to an embodiment of the present disclosure, the heat-resistant coating composition may further include a surfactant. The surfactant has a function of stably dispersing the binder and maintaining the binder in the dispersed state. Examples of the surfactant may include an oxyethylene/oxypropylene copolymer-based surfactant, a polyoxyethylene-based surfactant, an octyl phenyl ether-based surfactant, and an aliphatic alkylolamide-based surfactant.

The heat-resistant coating composition may additionally include a solvent. For example, an organic solvent, of which examples may include: a glycol or alcohol such as ethanol or butanol; a hydrocarbon-based material such as naphtha or kerosene; an ester-based compound such as ethyl acetate or butyl acetate; a ketone-based compound such as acetone or ethyl ketone; and an ether-based compound may be added to the coating composition.

According to an aspect of the present disclosure, the coating composition includes the inorganic filler and the binder and may be applied to the surface of a cooking utensil to form a coating layer, and in this case, it is preferable that coefficients of thermal expansion and thermal conductivities of the inorganic filler, the binder, and the base material meet a certain relationships as described below.

In general, a base material of a cooking utensil or the like is often a metal or an alloy, and the metal or alloy used as a base material may have various physical properties according to the composition thereof.

For example, aluminum has a coefficient of thermal expansion within the range of about 20 ppm/° C. to about 25 ppm/° C., and stainless steel has a coefficient of thermal expansion within the range of about 15 ppm/° C. to about 20 ppm/° C. In addition, aluminum has thermal conductivity within the range of about 150 W/m·K to about 200 W/m·K, and stainless steel has thermal conductivity within the range of about 16 W/m·K to about 17 W/m·K.

In addition, a Teflon® coating fluorine-based resin, which may be used as the binder, may has a coefficient of thermal expansion of about 90 ppm/° C. to about 130 ppm/° C., which is greater than that of general metals, and may have a thermal conductivity of about 0.2 W/m·K to about 0.3 W/m·K, which is lower than that of general metals. That is, the fluorine-based resin used as the binder has a higher coefficient of thermal expansion and lower thermal conductivity than the base material.

In this case, it is preferable that the coefficient of thermal expansion of the inorganic filler added to the coating composition be lower than that of the base material and that of the fluorine-based resin, and the thermal conductivity of the inorganic filler be lower than or equal to that of the base material but greater than that of the fluorine-based resin.

That is, it is preferable that the coefficient of thermal expansion of the inorganic filler included in the coating composition be lower than that of the binder and that of the base material, and the thermal conductivity of the inorganic filler be greater than that of the binder but lower than or equal to that of the base material.

The coefficients of thermal expansion of the inorganic filler, the binder, and the base material have the above-described relationship. That is, since the inorganic filler having a coefficient of thermal expansion relatively lower than that of the base material is added to the fluorine-based resin binder having a coefficient of thermal expansion greater than that of the base material, the coefficient of thermal expansion of the coating composition and the coefficient of thermal expansion of a coating layer formed of the coating composition are lower than the coefficient of thermal expansion of the binder, and may thus be less different from the coefficient of thermal expansion of the base material, thereby preventing separation or peeling of the coating layer and a decrease in the lifespan of the coating layer even when a cooking utensil is repeated heated and cooled.

According to an embodiment of the present disclosure, the coefficient of thermal expansion of the inorganic filler included in the coating composition may be within the range of $10 \times 10^{-6}/°$ C. to $15 \times 10^{-6}/°$ C. and preferably within the range of $12 \times 10^{-6}/°$ C. to $13 \times 10^{-6}/°$ C., and may be different from the coefficient of thermal expansion of the binder (described later) by $50 \times 10^{-6}/°$ C. to $200 \times 10^{-6}/°$ C., and preferably by $60 \times 10^{-6}/°$ C. to $150 \times 10^{-6}/°$ C.

The inorganic filler may have thermal conductivity within the range of 7 W/m·K to 11 W/m·K, and it is preferable that the inorganic filler includes an Fe-based amorphous alloy having thermal conductivity within this range.

If the coefficient of thermal expansion of the inorganic filler is greater than the range described above, or the difference between the coefficient of thermal expansion of the inorganic filler and the coefficient of thermal expansion of the binder is too small, the difference between the coefficient of thermal expansion of the coating layer and the coefficient of thermal expansion of a cooking surface of a cooking utensil or a primer coating layer is large, and thus the coating layer may be separated or peeled because of poor adhesion after being repeatedly heated and cooled. Conversely, if the coefficient of thermal expansion of the inorganic filler is lower than the range described above, or the difference between the coefficient of thermal expansion of the inorganic filler and the coefficient of thermal expansion of the binder is too large, the inorganic filler may be separated due to the difference between the coefficients of thermal expansion of the inorganic filler and the binder, and the lifespan of the coating layer may decrease.

In addition, when listed from one having the highest thermal conductivity, the base material, the inorganic filler, and the binder may be listed in this order. Owing to this relationship in thermal conductivity, the cooling surface of the base material having the highest thermal conductivity may be rapidly heated, and the inorganic filler uniformly dispersed on the cooling surface of the base material may be rapidly heated than the binder owing the thermal conductivity greater than that of the binder. Thus, heat conduction may occur uniformly over the entire cooking surface, and thus food may be rapidly and uniformly cooked compared to the case of using a coating layer not including the inorganic filler.

That is, compared to the case of using a coating layer formed of only a binder having relatively low thermal conductivity, the inorganic filler having higher thermal conductivity than the surrounding binder is dispersed such that the entire coating layer may be rapidly heated and surface temperature difference is reduced.

The thermal conductivity of the inorganic filler may vary depending on the composition of the alloy powder and may be greater than the thermal conductivity of a fluorine-based resin used as a binder and as a base component. However, the inorganic filler is not limited thereto.

When the thermal conductivity of the alloy powder is lower than that of the fluorine-based resin, the efficiency of heat conduction may be low because the alloy powder hinders heat conduction during heating of the base material.

The melting point of the binder is related to the hardening temperature of the coating composition, and hardening of the coating layer may be performed within the range of a temperature lower than the melting point of the binder by 50° C. to a temperature higher than the melting point of the binder by 50° C.

According to an embodiment of the present disclosure, the melting point of the binder containing a fluorine-based resin may be lower than the glass transition temperature (Tg) of the amorphous alloy powder, which is the inorganic filler, and the difference may preferably be 100° C. or more.

If the difference between the glass transition temperature of the alloy powder and the melting point of the binder is less than the value, when the coating layer is sintered, the alloy powder may soften and deform, or the height of the alloy powder exposed from the surface of the coating layer may decrease such that the alloy powder is depressed into the binder, resulting in poor abrasion resistance and poor properties on the surface of the coating layer.

Mode for Invention

Another aspect of the present disclosure provides a cooking utensil having a coating layer formed of the heat-resistant coating composition described above.

According to the aspect, the cooking utensil includes: a base material which is a base body formed according to uses and purposes; and a heat-resistant coating layer provided on a cooking surface which is a surface or inner surface of the base material and on which food is cooked or placed, the heat-resistant coating layer being formed by applying, curing, and drying the heat-resistant coating composition described above.

The heat-resistant coating layer may be formed on an inner cooking surface of the cooking utensil such as a pot or a frying pan. The heat-resistant coating layer may be directly provided on an inner surface of the base body of the cooking utensil or may be provided on a primer layer formed on the inner surface of the base body of the cooking utensil.

The base body of the cooking utensil is not limited. However, the base body of the cooking utensil may include: a metal or an alloy material such as iron, stainless steel, aluminum, or copper; or an inorganic material such as enamel, glass, or a ceramic.

In this case, an additional coating layer may be provided between the primer layer and the heat-resistant coating layer, and the types, number, thicknesses of coating layers between the base body of the cooking utensil and the heat-resistant coating layer are not limited. Preferably, the number of coating layers between the heat-resistant coating layer and the base body of the cooking utensil may be zero to three.

The heat-resistant coating layer is formed by spraying or applying the coating composition described above to the surface of the cooking utensil or the surface of the primer layer provided on the surface of the cooking utensil, and then heating and hardening the coating composition at a certain temperature. Thus, the heat-resistant coating layer includes: the same alloy powder as included in the coating composition as a filler; and the same binder as included in the coating composition.

In this case, the heat-resistant coating composition described above according to an aspect may preferably be a liquid coating composition.

When the liquid coating composition is used according to a preferred embodiment, a coating method is not limited. Examples of the coating method may include a conventional liquid spraying (conventional spray) method, an electrostatic spraying method, a dip-spin coating method, a hot flocking method, a coil coating method, a roller coating method, a fluidized bed spraying method, and an arc spraying method.

According to a preferred embodiment of the present disclosure, the thickness of the heat-resistant coating layer is not limited, but may be within the range of 10 µm to 40 µm, and preferably within the range of 20 µm to 30 µm. In this case, the particle diameter of the alloy powder used as a filler may be 0.0125 times to 0.5 times the thickness of the heat-resistant coating layer, and preferably 0.03 times to 0.25 times the thickness of the heat-resistant coating layer.

If the thickness of the heat-resistant coating layer is smaller than the range described above, or the ratio of the particle diameter of the alloy powder to the thickness of the heat-resistant coating layer is greater than the range described above, it is difficult for the inorganic filler to be uniformly dispersed in the coating layer, and a uniform coating film may not be formed. If the thickness of the heat-resistant coating layer is greater than the range described above, or the ratio of the particle diameter of the alloy powder to the thickness of the heat-resistant coating layer is smaller than the range described above, the alloy powder may not be uniformly dispersed throughout the depth or thickness of the heat-resistant coating layer in the coating film, thereby decreasing the density of the alloy powder on the surface of the coating layer or causing the alloy powder to clump together.

At least a part of surface of at least one inorganic filer among inorganic fillers dispersed in the heat-resistant coating layer may protrude outwardly from the heat-resistant coating layer. In this case, the exposed inorganic filler may increase surface roughness and prevent food from sticking to the surface of the coating layer when the food is cooked, thereby improving non-stickiness. In addition, when a cooking tool such as a spoon is brought into contact with the cooling utensil, the cooking tool may not come into contact with the binder or the coating layer but may come into contact with the surface of the exposed inorganic filler, thereby effectively preventing surface peeling or separation of the coating layer.

When the amorphous alloy powder is exposed from the heat-resistant coating layer, the height to which the inorganic filler protrudes from the surface of the heat-resistant coating layer may be defined as a protruding height h, and the protruding height h may be within the range of 100 nm to 5 µm, and preferably within the range of 200 nm to 3 µm.

In addition, the protruding height h at which the inorganic filler is exposed may preferably be within the range of 0.1 times to 0.5 times of the particle diameter of the inorganic filler, and preferably within the range of 0.1 times to 0.3 times of the particle diameter of the inorganic filler. If the protruding height and the thickness of the heat-resistant coating layer do not satisfy the ranges described above, the heat-resistant coating layer may be peeled off by contact with an external object, and the inorganic filler may be separated.

In addition, the protruding height may be 0.01 times to 0.1 times of the thickness of the heat-resistant coating layer, and preferably 0.02 times to 0.08 times of the thickness of the heat-resistant coating layer. If the ratio between the protruding height and the particle diameter of the alloy powder is outside the range mentioned above, the heat-resistant coating layer may be peeled off by contact with an external object, and the inorganic filler may be separated.

Another embodiment of the present disclosure provides a cooking utensil which has a composite coating layer including a heat-resistant coating layer and an upper layer additionally formed on the heat-resistant coating layer. Although the upper layer is further provided on the heat-resistant coating layer, the composite coating layer has good surface properties owing to excellent physical properties of an inorganic filler exposed from the surface of the heat-resistant coating layer.

When an additional material is further applied to or an additional coating layer is further provided on the coating layer having a protruding inorganic filler, the inorganic filler, which protrudes from an interface, may form a concave-convex portion, such that adhesion at an interface may be further improved.

The inorganic filler dispersed in the heat-resistant coating layer prevents peeling of the heat-resistant coating layer and improves the hardness, durability, and thermal conductivity of the heat-resistant coating layer.

In this case, it is preferable that the inorganic filler be dispersed with particles of the inorganic filler being apart from each other by a certain distance or more. In this case, the alloy powder, which is the inorganic filler included in the heat-resistant coating layer, may have a separation distance defined from the surface of the particle to the surface of a particle nearest to the particle, and the average of the separation distances may be 1 time to 5 times of the average particle diameter of the inorganic filler. For example, when the particle diameter of the alloy powder is 10 µm, the distance from the surface of a particle to another particle nearest to the particle in the alloy powder may be 10 µm to 50 µm on average.

When a particle of the alloy powder is located within a distance of 1.0 time of the particle diameter of the alloy powder from the surface of another particle of the alloy powder, the filler may have a poor fixing effect on the binder in the coating layer due to the small distance between the particles of the alloy powder, and thus the peeling off or separation of the coating layer may not be sufficiently prevented.

Here, the expression "a particle of the alloy powder is located within a distance" means that at least a portion of the particle is located within the distance.

In a square area having a width of 1 cm and a length of 1 cm on the surface of the heat-resistant coating layer, the area fraction of the inorganic filler exposed from the surface of the heat-resistant coating layer may be within the range of 0.3% to 1.4%, and preferably within the range of 0.5% to 1.0%.

If the area fraction of the inorganic filler exposed from the surface of the heat-resistant coating layer is lower than the range mentioned above, the effect of improving abrasion resistance on the surface of the coating layer may be low, and if the area fraction of the inorganic filler is greater than the range, non-stickiness may deteriorate or swelling may occur.

Since the heat-resistant coating layer according to an aspect of the present disclosure has heat resistance and non-stickiness, the heat-resistant coating layer may be used for cooking utensils and food-related industrial tools, such as frying pans, saucepans, grills, pots, ovens, hot plates, bread molds, kitchen knives, kettles, electric pots, trays, dough rolls, rolling rolls, conveyors, and hoppers.

EXAMPLES

Example 1—Preparation of Heat-Resistant Coating Composition

Tetrafluoroethylene-perfluoro(alkyl vinyl ether) copolymer [PFA] was mixed with an Fe-based amorphous alloy powder inorganic filler having an average particle diameter of 13 μm while adjusting the weight ratio of PFA:inorganic filler to be 96:4, so as to prepare a heat-resistant coating composition.

Examples 2 to 6—Preparation of Heat-Resistant Coating Compositions

As shown in Table 1 below, heat-resistant coating compositions were prepared while changing the composition of a fluorine-based resin in a binder, the average particle diameter of an inorganic filler, and the weight ratio of the binder and the inorganic filler.

Comparative Examples 1 to 3—Preparation of Heat-Resistant Coating Compositions

As shown in Table 1 below, a heat-resistant coating composition was prepared by selecting a fluorine-based resin of a binder, adjusting the weight mixing ratio of the binder and an inorganic filler to be 90:10, and using powder having an average particle diameter of 20 μm as the inorganic filler.

In Comparative Example 2, a coating composition containing only a binder without an inorganic filler was prepared.

TABLE 1

| | Binder | Weight mixing ratio (binder: inorganic filler) | Average particle diameter of inorganic filler (μm) | Melting point of binder (° C.) | Glass transition temperature of inorganic filler (° C.) |
|---|---|---|---|---|---|
| Example 1 | PFA | 96:4 | 13 | 300 | 500 or more |
| Example 2 | PFA | 99:1 | 12 | 300 | 500 or more |
| Example 3 | ETFE | 96:4 | 15 | 270 | 500 or more |
| Example 4 | ETFE | 95:5 | 5 | 270 | 500 or more |
| Example 5 | PEP | 98:2 | 1 | 260 | 500 or more |
| Example 6 | PEP | 97:3 | 12 | 260 | 500 or more |
| Comparative Example 1 | PFA | 90:10 | 20 | 300 | 500 or more |
| Comparative Example 2 | PEP | 100:0 | — | 260 | — |

EXPERIMENTAL EXAMPLES

Experimental Examples 1 to 8

The heat-resistant coating compositions of Examples 1 to 6 and Comparative Examples 1 to 2 were applied to base materials specified in Table 2 below to form coating layers, and the non-stickiness, swelling, and impact resistance of each of the coating layers were tested.

Experimental methods and conditions are as follows, and results of the experiment and thermal characteristics of Experimental Examples 1 to 5 are shown in Tables 2 and 3 below.

1) Non-Stickiness Test

After breaking and put eggs on the coating layers of Experimental Examples 1 to 5, 20 minutes passed until the eggs were cooked. Then, the eggs were removing with a wooden spatula, and the coating layers were wiped with soft loofah wet with a neutral detergent. These processes were set as one cycle, and the cycle was repeated ten times. Thereafter, it was evaluated with the naked eye whether egg remained on the coating layers and whether the coating layers were damaged.

2) Impact Resistance Test

The coating layers of Experimental Examples 1 to 5 were impacted by a 500 g steel ball from a height of 50 cm with a Dupont-type impact tester according to ATSTM D2794, and then it was observed and evaluated with the naked eye whether the coating layers were cracked.

3) Swelling Test

The surfaces of the coating layers of Experimental Examples 1 to 5, which were cured, were observed with the naked eye to evaluate whether there were swells, bubbles, or separated portions.

TABLE 2

| | Non-stickiness | Swelling | Impact resistance | Note |
|---|---|---|---|---|
| Experimental Example 1 | ◎ | ◎ | ○ | |
| Experimental Example 2 | ◎ | ◎ | ○ | |
| Experimental Example 3 | ◎ | ◎ | ○ | |
| Experimental Example 4 | ◎ | ○ | ○ | |
| Experimental Example 5 | ◎ | ○ | ○ | |
| Experimental Example 6 | ◎ | ◎ | ○ | |
| Experimental Example 7 | ○ | Δ | ○ | Comparative Example 1 |
| Experimental Example 8 | ○ | ○ | Δ | Comparative Example 2 |

Legend:
◎ = Excellent
○ = Good
Δ = Fair

TABLE 3

| | | Physical properties | |
|---|---|---|---|
| | Material | Coefficient of thermal expansion ($10^{-6}$/° C.) | Thermal conductivity (W/m · K, @ 100° C.) |
| Base material | Stainless steel (ST304) | 16.7 to 17.2 | 16.2 |
| | Al alloy | 20 to 23 | 151~202 |
| | Al alloy | 20 to 23 | 151~202 |
| | Stainless steel (ST304) | 16.7 to 17.2 | 16.2 |
| | Stainless steel (ST304) | 16.7 to 17.2 | 16.2 |
| Binder | PFA | 93 | 0.24 |
| | ETFE | 120 | 0.25 |
| | PEP | 105 | 0.25 |
| Inorganic filler | Fe-based amorphous alloy | 12.5 | 7~11 |

The features, structures, effects, or the like illustrated as examples in the embodiments above may be combined or modified in other embodiments by those of ordinary skill in the art. Thus, these combinations and modifications should be considered as being included in the scope of the present disclosure.

The invention claimed is:
1. A heat-resistant coating composition comprising:
an inorganic filler which is iron (Fe)-based amorphous alloy powder having an amorphous phase and an average particle diameter of 0.5 μm to 15 μm; and
a binder, wherein the inorganic filler has a thermal expansion coefficient lower than a thermal expansion coefficient of the binder, wherein the heat-resistant coating composition comprises 1 wt % to 5 wt % of the inorganic filler, wherein the inorganic filler protrudes outwardly from a surface of a coating layer formed from the heat-resistant coating composition.

2. The heat-resistant coating composition of claim 1, wherein the inorganic filler has a thermal conductivity greater than a thermal conductivity of the binder.

3. The heat-resistant coating composition of claim 1, wherein the inorganic filler has a glass transition temperature (Tg) higher than a melting point (Tm) of the binder.

4. The heat-resistant coating composition of claim 3, wherein the binder comprises a fluorine-based resin comprising at least one of PTFE, ETFE, FEP, and PFA.

5. The heat-resistant coating composition of claim 3, wherein the inorganic filler is alloy powder comprising iron (Fe) and at least one selected from the group consisting of molybdenum (Mo), chromium (Cr), boron (B), carbon (C), nickel (Ni), cobalt (Co), silicon (Si), phosphorus (P), and niobium (Nb).

6. A heat-resistant coated member comprising:
a heat-resistant coating layer formed of the heat-resistant coating composition of claim 1; and
a base material on which the heat-resistant coating layer is provided.

7. The heat-resistant coated member of claim 6, wherein the heat-resistant coating layer has a thickness of 20 μm to 30 μm.

8. The heat-resistant coated member of claim 6, wherein the average particle diameter of the inorganic filler is 0.0125 times to 0.5 times of a thickness of the heat-resistant coating layer.

9. The heat-resistant coated member of claim 6, wherein the inorganic filler protrudes outwardly from a surface of the heat-resistant coating layer, and
a protruding height of the inorganic filler protruding outwardly from the surface of the heat-resistant coating layer is 0.01 times to 0.1 times of a thickness of the heat-resistant coating layer.

10. The heat-resistant coated member of claim 9, wherein the protruding height is 0.1 times to 0.5 times the average particle diameter of the inorganic filler.

11. The heat-resistant coated member of claim 9, wherein when an arbitrary square area having a width of 1 cm and a length of 1 cm is defined on the surface of the heat-resistant coating layer, and wherein the inorganic filler has an area fraction of 0.3% to 1.4% in the surface.

* * * * *